J. BRENZINGER.
COVER FEED FOR CAN HEADING MACHINES.
APPLICATION FILED DEC. 10, 1917.
1,292,695.
Patented Jan. 28, 1919.
7 SHEETS—SHEET 1.
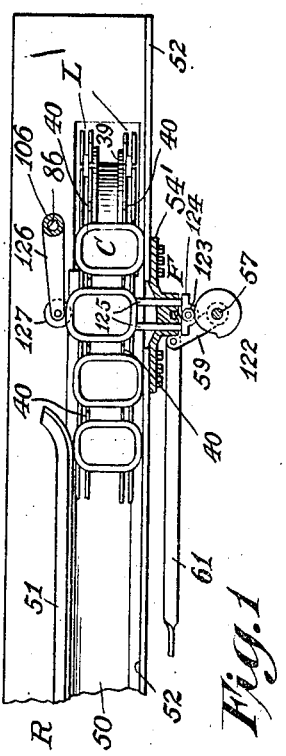
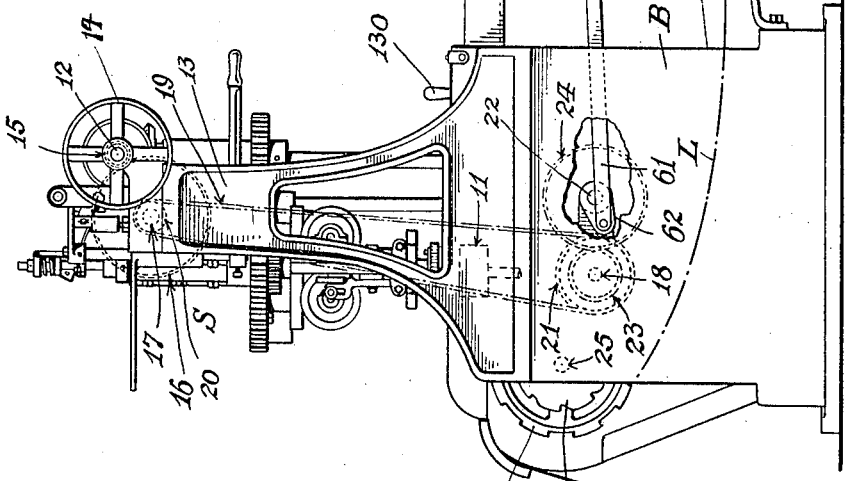
Inventor:

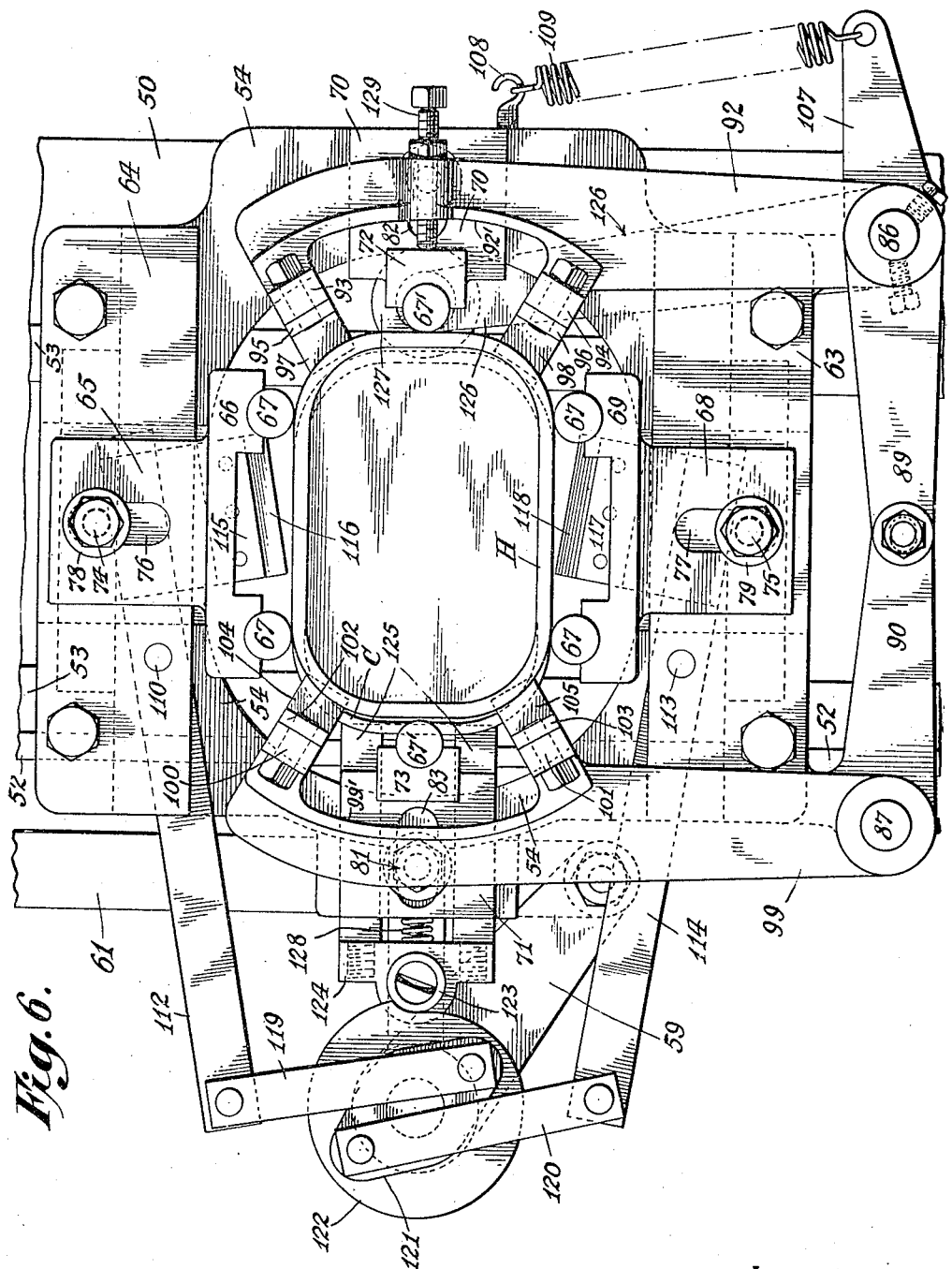

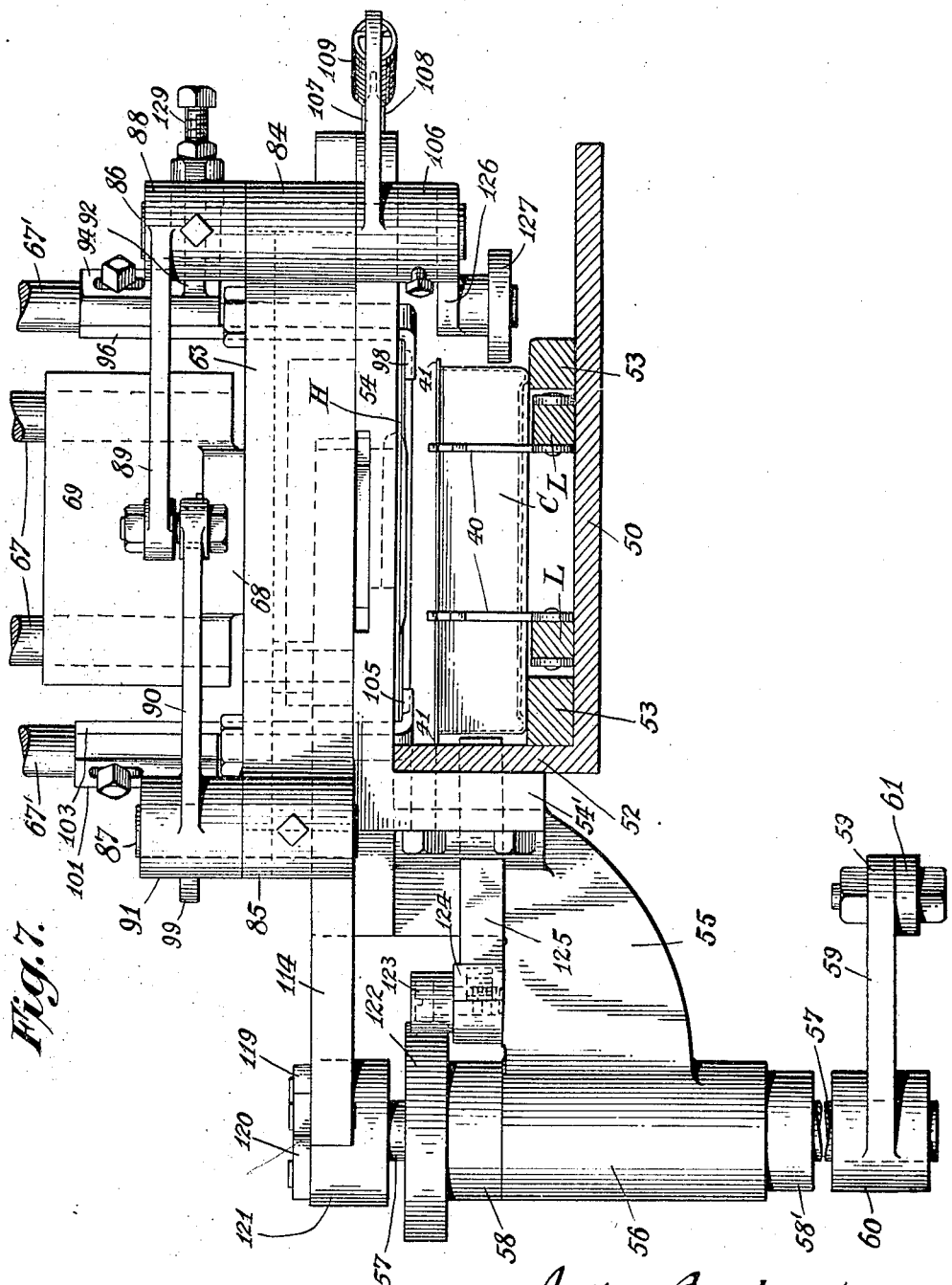

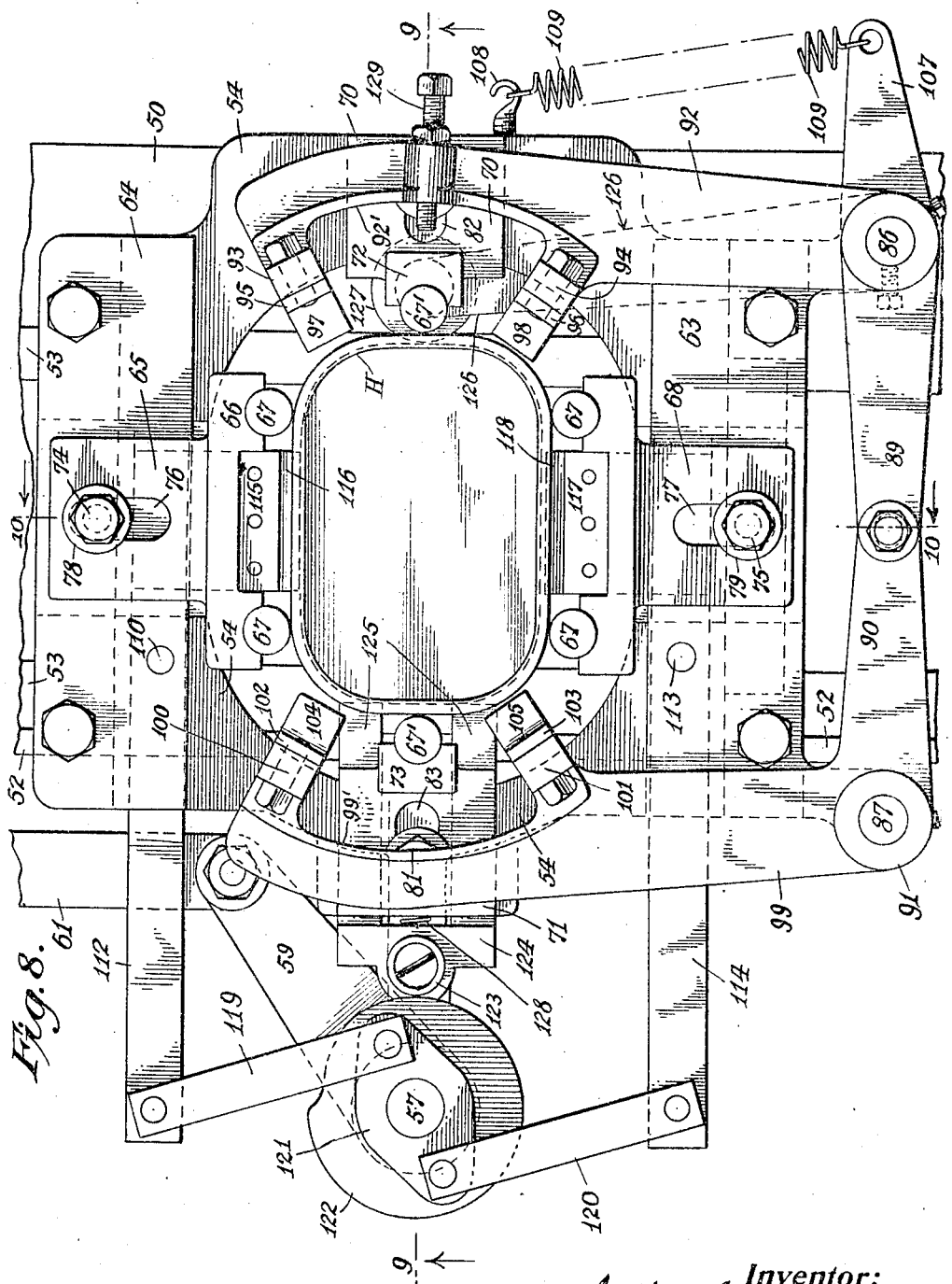

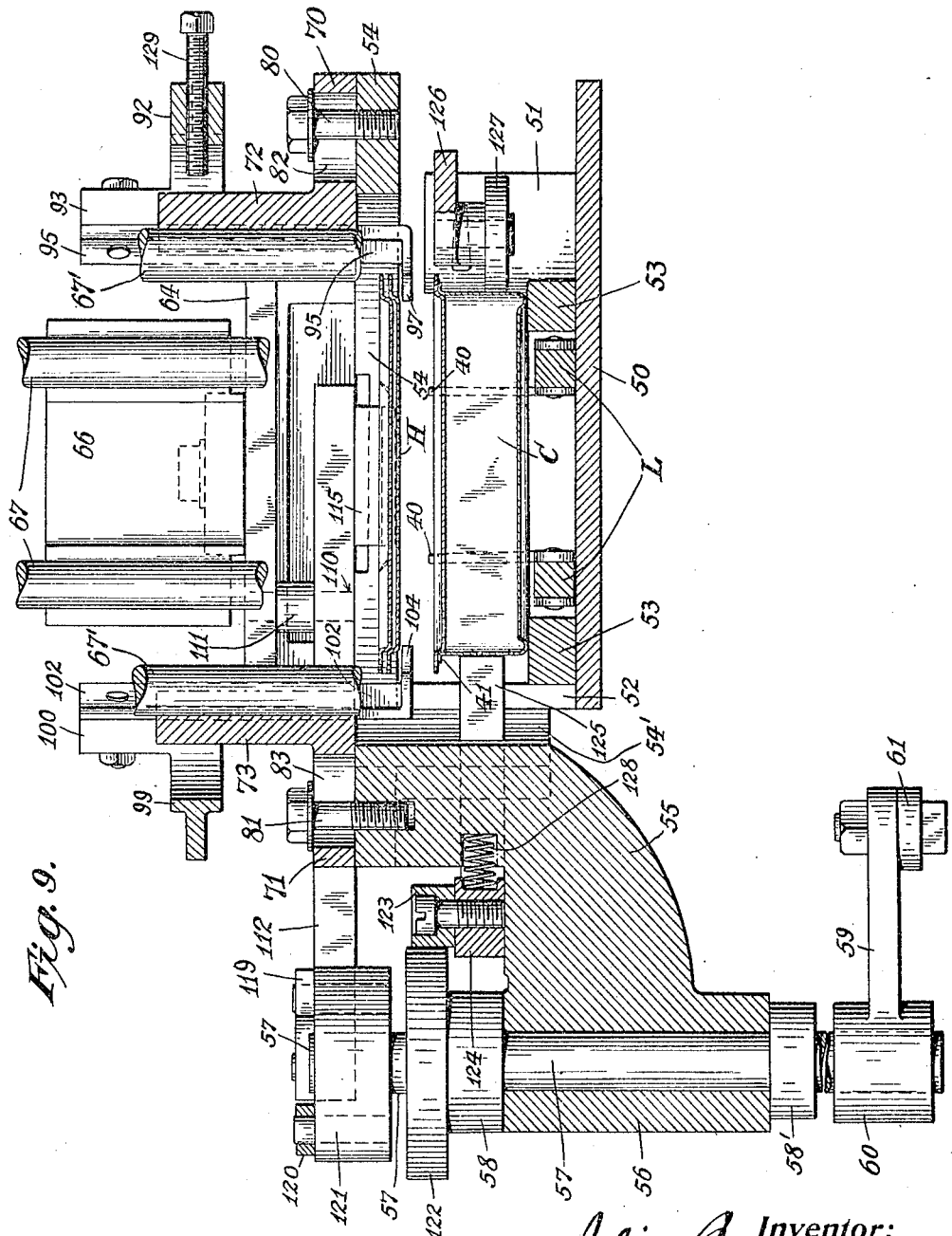

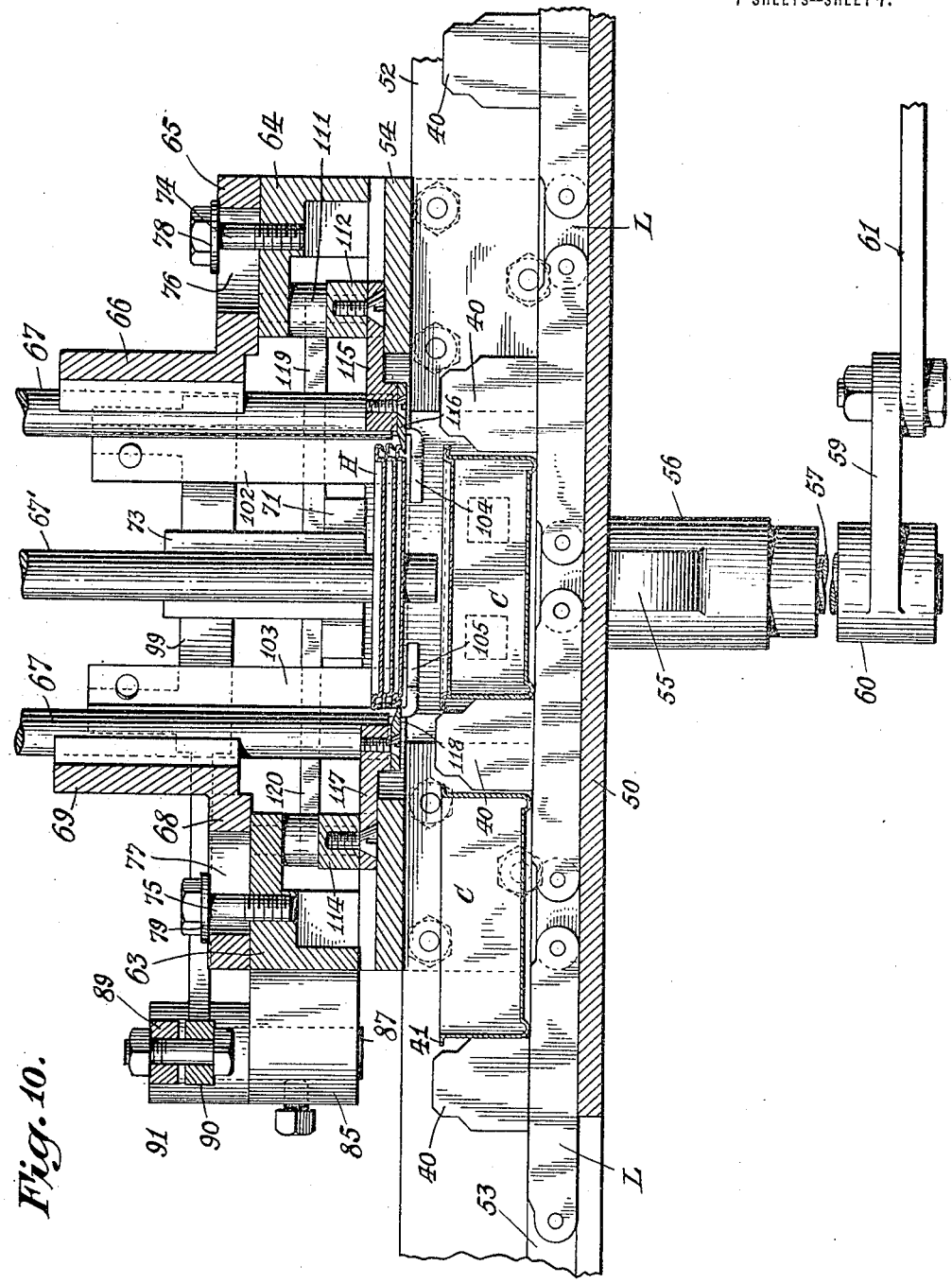

UNITED STATES PATENT OFFICE.

JULIUS BRENZINGER, OF FAIRFIELD, CONNECTICUT, ASSIGNOR TO SANITARY CAN MACHINERY COMPANY, OF ELLSWORTH, MAINE, A CORPORATION OF MAINE.

COVER-FEED FOR CAN-HEADING MACHINES.

1,292,695.     Specification of Letters Patent.     Patented Jan. 28, 1919.

Application filed December 10, 1917. Serial No. 206,528.

*To all whom it may concern:*

Be it known that I, JULIUS BRENZINGER, a citizen of the United States, residing at Fairfield, in the county of Fairfield and State of Connecticut, have invented certain new and useful Improvements in Cover-Feeds for Can-Heading Machines, of which the following is a specification.

This invention relates generally to devices appurtenant to or designed to be used in connection with can heading machines for automatically assembling the parts of the cans to be headed and conveying the assembled parts to and positioning the same in the heading or seaming mechanism, with more particular reference to so-called "square" cans.

It will be appearent that in an attempt to position a head or cover on a "square" can-body and deliver these assembled parts to the seaming mechanism of a heading machine, difficulties are presented which are not encountered in an effort to accomplish the same results in connection with so-called "round" cans. In the latter case, in assembling can and head or cover in superposed arrangement, the relative disposition of the head or cover in the horizontal plane is obviously immaterial, nor need any account be taken of what may be termed the rotative position of the assembled parts—relative to each other or relative to their supports—in the seaming mechanism. In connection with "square" cans, however—which are far more commonly oblong rather than "square" in horizontal cross-sectional configuration—it is essential that a definite positional relationship be established and maintained between can bodies and can covers in process of assembling and between the assembled can parts and the seaming mechanism in delivering the former to and positioning the same in the latter.

The principal objects of the present invention may be said to be, first, the provision of a square-can cover feeding device in which the establishment and maintenance of the positional relationship to which I have above referred is insured; second, the provision of a device in which no head or cover is delivered in the absence of a can-body positioned to receive the same, thus eliminating the possibility of the delivery of covers alone to the seaming mechanism which would undoubtedly clog the machine and possibly result in the breakage of parts thereof; third, the provision of a feeding device easily and readily adjusted to heads or covers for cans of different sizes; and, fourth, the provision of a feeding device which is comparatively simple in construction, dependable in operation, and in which all parts are comparatively readily accessible for repair and replacement. It is to be understood, furthermore, that while the device which I am about to describe as embodying my invention is particularly adapted for employment in connection with machines for heading so-called "square" cans, it could, with a few minor alterations, be just as well adapted for employment in connection with machines for heading so-called "round" cans.

My invention will be more readily understood by reference to the accompanying drawings, forming a part of this specification, in which I have shown a practical and convenient embodiment of the invention, and in which—

Figure 1 is a side elevation of a can heading machine equipped with a cover feeding device embodying my invention;

Fig. 2 is a horizontal section taken substantially on the line 2—2 of Fig. 1;

Fig. 6 is a plan view of the cover feed mechanism prior to the delivery of a cover to the can positioned therein;

Fig. 7 is an end elevation thereof, the run-way and the conveyer-chain being shown in section;

Fig. 8 is a top plan view similar to Fig. 6 with the parts in the relative positions assumed during delivery of a head or cover to a can body positioned to receive the same;

Fig. 9 is a section taken substantially on the line 9—9 of Fig. 8, and

Fig. 10 is a section taken substantially on the line 10—10 of Fig. 8.

Figure 3:
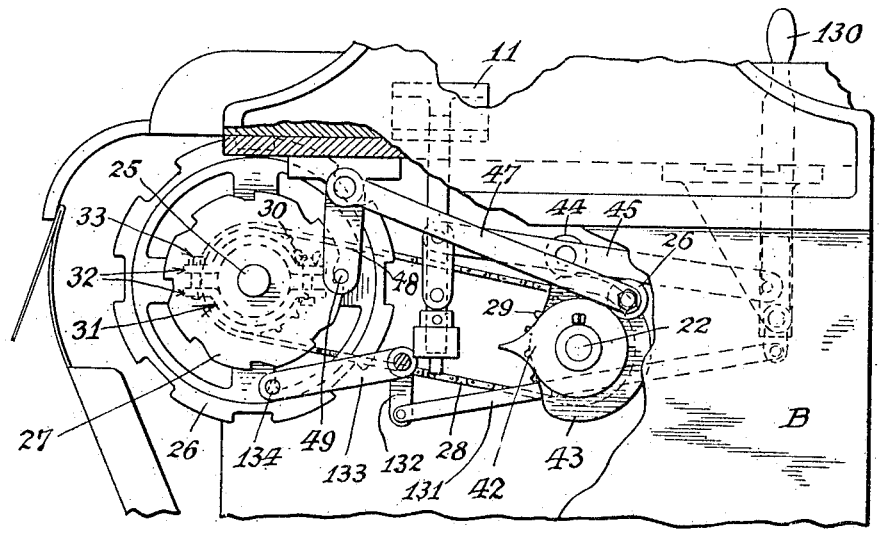
Fig. 3 is an enlarged side elevation of the parts within the base of the heading machine, a portion of the side of the frame having been broken away.
Figure 4:
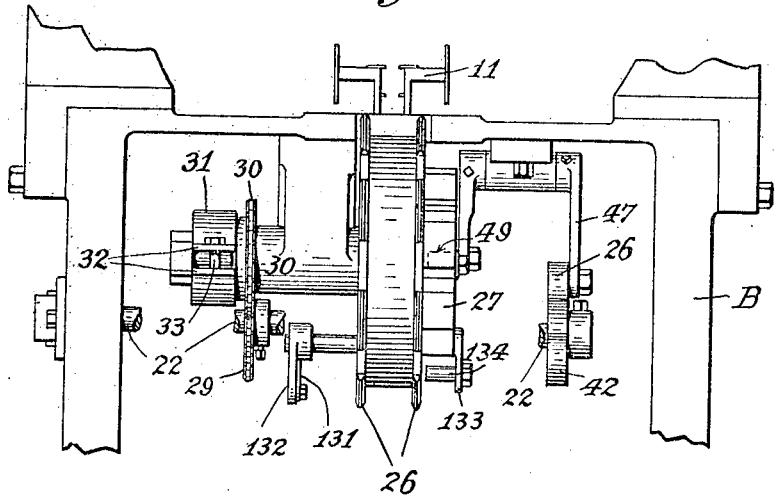
Fig. 4 is a fragmentary end view thereof.
Figure 5:
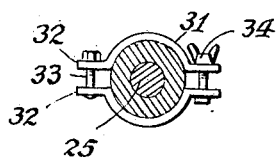
Fig. 5 is a sectional detail view of the friction clamp through which the can conveyer is actuated, as hereinafter described.

Referring now to the drawings in detail, S designates a can heading machine of the double-seaming type, mounted upon a heavy supporting base frame B, which also supports one end of a run-way R along which the filled cans to which covers have been applied by the cover feeding device F are conveyed by the endless chain L to the seaming mechanism of the heading machine S. This heading machine *per se* forms no part of the present invention, which might be applied successfully to any one of a number of different types of double seamers, and therefore it need not be described in detail in this specification. It may be stated, however, that I prefer to employ, and for the purposes of this description have shown, a heading machine for "square" cans such as that shown and described by me in a prior Patent, No. 941,755, granted November 30, 1909, with which the feeding device of this application is well adapted to be used. Just what final disposition is made of the filled and covered cans after being carried by the chain L through and beyond the cover feeding device F, is not material to the present invention, for there are any number of different ways of successively positioning the assembled parts of cans to be headed in the seaming mechanism of a heading machine, but it may be assumed for the purposes of this description that the filled and covered cans are delivered by the chain L successively upon a vertically reciprocating platform or lower chuck 11 which raises the assembled can parts in the usual manner to the upper chuck which supports them against the forces of the seaming operation.

The heading machine as well as the cover feeding device is primarily actuated from a shaft 12, suitably journaled in bearings at the upper ends of the arms or standards 13 (only one of which is shown, the other being its opposite counterpart), which is driven by the pulley 14 connected in the usual manner with any convenient source of power. On the shaft 12 is mounted a pinion 15 in mesh with a gear 16 on a shaft 17 from which the shaft 18 in the base B is driven by means of the chain 19 passing around the sprockets 20 and 21 on said shafts, respectively. A shaft 22 is driven from the shaft 18 by means of a pinion 23 on the latter, in mesh with a gear 24 on the latter.

Mounted on a shaft 25 in the base B is a double-sprocket 26 and a ratchet 27. This shaft 25 is frictionally driven from the shaft 22 by means of a chain 28 passing around a sprocket 29 fixed on the shaft 22 and a sprocket 30 frictionally mounted on the shaft 25 through the interposition of the split-collar 31 the sections of which are provided with the lugs 32 32 held together on one side by the bolt 33 and on the other by the tension-adjusting thumb-screw 34—a common and well-known expedient. Therefore, the shaft 25 is normally rotated upon rotation of the shaft 22, but the former may be checked against rotation, under the influence of the rotating split-collar 31, during continued rotation of the shaft 22.

The run-way R, which is supported at its far end by the adjustable standard or post 37, carries the downwardly projecting bracket 38 and its opposite counterpart in which is journaled the axle of a double-sprocket 39, around which and around the double-sprocket 26 pass the chains L L, the inside bar of each of the longer links thereof being provided with a finger 40. The fingers on both chains are correspondingly located and spaced apart the proper distance to permit of the reception therebetween of can bodies, as best shown in Fig. 10. For the purposes of this description, I have selected a shape of can which has been popularized as a container for sardines, and it may be stated that all can bodies, prior to the seaming of the heads thereon, are provided with a flange 41 at the upper edge thereof adapted to be intercurled with a corresponding flange on the head or cover and compressed into a hermetic bead or seam.

On the shaft 22 are mounted the cams 42 and 43, the latter operating through a roller 44 to reciprocate an arm 45 which through suitable connections (which, being of common and well-known construction and operation and forming no part of the present invention, are not shown in the drawings) raises and lowers the platform or lower chuck 11. The cam 42, once during each revolution of the shaft 22, operates through the roller 26 to reciprocate the arm 47 of a bell-crank lever the other arm 48 of which carries a pin 49 adapted to engage a tooth in the ratchet 27 and check movement of the latter and therewith of the shaft 25 and the double-sprocket 26, the split-collar 31 continuing to revolve as hereinbefore explained. It will be apparent, therefore, that the chains L will be intermittently driven, a short period of rest following each forward movement thereof.

The run-way R comprises the floor or base-plate 50, the side guides 51 and 52 and the track-bars 53 53 which elevate the cans and permit of the passage thereunder of the chains L L. To provide for actuation of the cover-feed mechanism, the guide 52 is in sections with a space therebetween, and bolted or otherwise suitably secured to the section ends is the vertical web 54' of a casting which includes the horizontal plate 54 and the arm 55, this casting supporting all of the parts and mechanisms of the cover feeding device. At the end of the arm 55 are provided bearings 56 for the short vertical shaft 57 which is supported between the fixed collars 58 and 58'. The shaft 57 is rocked by means of the crank 59 on the collar 60 fixed on said shaft, to the end of which is pivoted the end of a connecting-rod 61 the other end of which is pivoted to the crank 62 on the shaft 22. It will therefore be seen that upon rotation of the shaft 22 the shaft 57 will be rocked.

The plate 54 is provided with a relatively large central orifice—somewhat larger than the largest can cover which the device is adapted to deliver—and mounted one at each end of this plate 54 are the angle-plates 63 and 64, the horizontal wing of each thereof being uppermost. To the horizontal wing of the plate 63 is bolted the base 65 of a casting the vertically disposed portion 66 of which is shaped to receive and support—secured thereto in any suitable manner, as by soldering or brazing—two of the posts 67 67. Similarly, the horizontal wing of the plate 64 carries the base 68 of a casting the vertically disposed portion 69 of which similarly carries the oppositely located posts 67 67.

On the plate 54, at the sides of the orifice therethrough intermediate the sides upon which the members 66 and 69 are located, are mounted the horizontal bases 70 and 71 carrying the vertical arms 72 and 73 which similarly carry the posts 67' 67'. These posts 67 67' form a hopper for the can covers and serve to retain the same in stacked arrangement. Covers for so-called "square" cans, in order to be retained in corresponding or registering positions when in stacked arrangement, should have at least two supporting posts on each of two opposite sides of the stack, while one post at each of the other two sides will suffice. If the can covers are really oblong, obviously the two posts should be located at each of the two longer sides of the cover. Therefore, I have shown the posts 67 67 for supporting and guiding the stack at the longer sides of the covers and the posts 67' 67' for supporting and guiding the stack at the shorter sides or ends thereof.

It will be noted, furthermore, that the bases 65 and 68 of the post-carrying members 66 and 69 are secured to the plates 63 and 64, respectively, by means of bolts 74 and 75 passing through slots 76 and 77 in said plates, the heads of which bolts act against washers 78 and 79 which span said slots. Similarly, the bases 70 and 71 of the post-carrying arms 72 and 73 are secured to the plate 54 by means of bolts 80 and 81 passing through slots 82 and 83 in said bases and acting against washers which span said slots. In this manner it will be apparent that the posts 67 67' may be secured in various relative positions to receive and retain covers of different sizes.

From the ends of the vertical wing of the angle-plate 63 project arms at the ends of which are the bearing blocks 84 and 85 for the vertical shafts 86 and 87, respectively. At the top of the shaft 86 is mounted the fixed collar 88 from which projects the crank 89 which has the usual pin-and-slot pivotal connection (dotted lines in Figs. 6 and 8) with the end of the crank 90 projecting from a collar 91 fixed at the upper end of the shaft 87. Through this connection, it will be apparent that upon rocking the shaft 86 the shaft 87 will be rocked in an opposite direction.

From the collar 88 on the shaft 86 also projects an arm 92 which extends to or beyond the orifice in the plate 54 and opposite said orifice is preferably provided with an elongated lateral recess 92'. At the ends of this recess are provided heads 93 and 94 to which are bolted the vertical bars 95 and 96, respectively, the lower ends of which are bent inwardly to form the supporting lips 97 and 98 at the rounded corners of the contiguous end of the bottom cover H of the stack. Similarly, from the fixed collar 91 on the shaft 87 projects the arm 99, also preferably provided with a corresponding recess 99' at its free end at the ends of which are the heads 100 and 101 to which are bolted the bars 102 and 103, respectively, the lower ends of which are bent to provide the supporting lips 104 and 105 for the other end of the bottom cover of the stack. It will be apparent that with the arms 92 and 99 swung to their innermost positions, as shown in Fig. 6, the stack of covers between the posts 67 67' will be stably supported. The lips 97, 98, 104 and 105 will hereinafter be referred to as the primary supporting means for the stack.

On the shaft 86 is also mounted the fixed collar 106 from which projects the arm 107 between the free end of which and a hook 108 in the edge of the plate 54 a spring 109 is in tension, whereby said primary supporting means are yieldingly held in effective positions and are moved to ineffective positions against the action of said spring.

Pivoted at 110 to the under side of the plate 64, preferably through the interposition of a boss 111, is an arm 112 which has oscillatory sliding movement on the plate 54. Similarly, pivoted at 113 to the under side of the plate 63 is the arm 114 which has corresponding oscillatory sliding movement on the plate 54 on the opposite side of the orifice in said plate and, consequently, on the opposite side of the supported stack of covers. To the end of the arm 112 is secured the plate 115 which in turn carries the edged blade 116. Similarly, at the end of the arm 114 is secured the plate 117 carrying the edged blade 118. If "square" can covers are to be fed, I prefer that the flange of each thereof be turned down on two opposite sides of the cover, to prevent close nesting of the covers, as shown in Fig. 13

10 and as shown and described in detail in a co-pending application filed by me on June 8, 1917, Serial No. 173,491, and the edged blades 116 and 118 are so relatively positioned that upon oscillation of the arms 112 and 114 in opposite directions the sharp edges of the blades will alternately penetrate the stack of covers between the bottom cover and the remainder of the stack, thus releasing the bottom cover and supporting the remainder of the stack during withdrawal of said bottom cover from said stack. I shall hereinafter refer to the blades 116 and 118 and their supporting means as the secondary supporting means for the stack of covers.

The arms 112 and 114 are oppositely oscillated to operate the blades 116 and 118 by means of connecting rods 119 and 120 having pivotal connection with the ends of said arms, respectively, and with opposite ends of the oscillating double-crank lever 121, mounted at the upper end of the rock shaft 57. These parts are so relatively positioned and adjusted that the secondary supporting means is rendered effective coincidently with withdrawal of the primary supporting means, and vice versa, whereby upon withdrawal of the primary supporting means all covers except the lowermost are temporarily supported by the secondary supporting means and the lowermost cover of the stack permitted to drop through the orifice in the plate 54 and lodge upon the open top of a container or can body brought to position underneath the stack. The primary supporting means is then immediately returned to effective position and the secondary supporting means coincidently withdrawn for a repetition of the above-described cover feeding operation.

The posts 67 67′ are so located that the stack of covers H is slightly off-set laterally from the path of forward movement of the containers C which are passed underneath said stack by the chain L, as best shown in Figs. 6 and 7. On the rock shaft 57 is mounted a cam 122 adapted to act against a roller 123 on the cross-bar 124, which carries the pusher-bars 125 125, to reciprocate said pusher-bars in one direction. The ends of these pusher-bars 125 125 are adapted upon reciprocation thereof to impinge against the end of a can body C which has been brought to position underneath the stack of covers H and push said can body laterally to registry with the slightly off-set stack, so that a released cover will be properly positioned on said can body by gravity alone. On the collar 106 fixed on the shaft 86 is mounted an arm 126 carrying at the free end thereof a roller 127 which is normally so positioned as to be engaged by the can when the latter is pushed laterally by the bars 125. Thus the positioning of the can body directly underneath the stack of covers operates through the oscillation of the arm 126 to rock the shaft 87 with the effect of withdrawing the primary supporting means and rendering effective the secondary supporting means in the manner described. It will be seen, therefore, that in the absence of a can body being positioned for the reception of a cover, the primary supporting means will not be withdrawn and no cover will be released. I consider this one of the more important features of my invention.

Immediately following the release of a cover, the shaft 57 is rocked and the cam 122 rotated to release the bar 124 which with the pusher-bars 125 is returned to initial position by means of the spring 128, in compression, whereupon the can body to which a cover has just been applied is returned to its normal path of movement by the roller 127 upon movement of the arm 126 under action of the spring 109. Movement of the shaft 86 with the arm 126 under action of the spring 109 also effects restoration of the primary supporting means, in the manner described, and withdrawal of the interposed secondary supporting means is effected through coincidental actuation of the arms 112 and 114 upon oscillation of the double-crank lever 121.

There is little, if any, danger of excessive outward movement of the arms 92 and 99 as such movement would be opposed by the action of the spring 109, but I prefer to provide against excessive inward movement of said arms through the provision of a screw 129 the end of which is adapted to impinge against the post-supporting bar 72, thus constituting an adjustable stop to positively limit inward movement of the arm 92 and therefore through the connections described of the arm 99.

Checking of movement of the conveyer L through the passing of the pin 49 on the arm 48 into position to engage a tooth on the ratchet 27, as explained, has a two-fold function; first, it suspends deliveries of assembled can parts to the platform or lower chuck 11 during each seaming operation, and, second, it stops movement of the advancing can bodies so that the one thereof which has been conveyed to the cover feeding device may be moved laterally to position underneath the stack of covers, thereby effecting the release of the bottom cover of the stack in the manner hereinbefore explained. Obviously, all of the parts are so proportioned and adjusted that a covered can is positioned in the seaming mechanism simultaneously with the positioning of a can body in the cover feeding device, and immediately thereafter movement of the conveyer is checked. The container is retained in a condition of rest during the seaming and the cover delivering operations, and immediately thereafter the arm 48 is actuated to withdraw the pin 49 from engagement with a tooth of the ratchet 27 to permit of further movement of the conveyer-actuating sprocket wheel 26.

Many modifications of minor details of my improved cover feed for can heading machines will doubtless readily suggest themselves to those skilled in the art to which it appertains, and I therefore do not desire to limit my invention to the specific construction herein shown and described.

I claim as new and desire to secure by Letters Patent:

1. In a device of the character described, the combination, with intermittently actuated means for advancing can bodies successively to the seaming mechanism of a heading machine, and means for delivering a head or cover to each of said can bodies in turn while said advancing means are at rest, of means operable only through the interposition of a can body therein for actuating said cover delivering means.

2. In a device of the character described, the combination, with means for advancing can bodies successively to the seaming mechanism of a heading machine, and means for deflecting each can body in turn from its normal path of advancing movement, of means for delivering a head or cover to each can body so deflected, and means operated by a can body being deflected to actuate said cover delivering means.

3. In a device of the character described, the combination, with intermittently actuated means for advancing can bodies successively to the seaming mechanism of a heading machine, and means for laterally deflecting each can body in turn from its normal path of advancing movement when said advancing means are at rest, of means for delivering a head or cover to each can body so deeflcted, and means operated by the lateral movement of a can body being deflected to actuate said cover delivering means.

4. In a device of the character described, the combination, with intermittently actuated means for advancing can bodies successively to the seaming mechanism of a heading machine, means for holding a supply of heads or covers for said bodies, and means for delivering a head or cover from said holding means to each of said can bodies in turn while said advancing means are at rest, of means operable only through the interposition of a can body therein for actuating said cover delivering means.

5. In a device of the character described, the combination, with means for advancing can bodies successively to the seaming mechanism of a heading machine, means for holding a supply of heads or covers for said bodies, and means for deflecting each can body in turn from its normal path of advancing movement, of means for delivering a head or cover from said holding means to each can body so deflected, and means operated by a can body being deflected to actuate said cover delivering means.

6. In a device of the character described, the combination, with intermittently actuated means for successively advancing can bodies to the seaming mechanism of a heading machine, means for holding a supply of heads of covers for said bodies, and means for deflecting each can body in turn from its normal path of advancing movement when said advancing means are at rest, of means for delivering a head or cover from said holding means to each can body so deflected, and means operated by the lateral movement of a can body being deflected to actuate said cover delivering means.

7. In a device of the character described, the combination, with intermittently actuated means for advancing can bodies successively to the seaming mechanism of a heading machine, means for retaining in stacked arrangement a supply of heads or covers for said can bodies, and means for releasing the bottom cover of the stack for delivery to a can body in transit while said advancing means are at rest, of means operable only through the interposition of a can body therein for actuating said cover releasing means.

8. In a device of the character described, the combination, with means for advancing can bodies successively to the seaming mechanism of a heading machine, means for retaining in stacked arrangement a supply of heads or covers for said can bodies, and means for temporarily deflecting each can body in turn from its normal path of advancing movement, of means for releasing the bottom cover of the stack for delivery to each can body so deflected, and means operated by a can body being deflected to actuate said cover delivering means.

9. In a device of the character described, the combination, with intermittently actuated means for successively advancing can bodies to the seaming mechanism of a heading machine, means for retaining in stacked arrangement a supply of heads or covers for said can bodies, and means for deflecting each can body in turn from its normal path of advancing movement when said advancing means are at rest, of means for releasing the bottom cover of the stack for delivery to each can body so deflected, and means operated by the lateral movement of a can body being deflected to actuate said cover delivering means.

10. In a device of the character described, the combination, with means for advancing can bodies successively to the seaming mechanism of a heading machine, and means for delivering a head or cover to each of said can bodies in transit, said delivering means being located above and slightly offset from the path of movement of the advancing can bodies, of means for shifting each can body in turn from position in its normal path of advancing movement to position for the reception of a delivered head or cover and by such shifting movement actuate said cover delivering means.

11. In a device of the character described, the combination, with intermittently actuated means for advancing can bodies successively to the seaming mechanism of a heading machine, and means for delivering a head or cover to each of said can bodies in turn while said advancing means is at rest, said delivering means being located above and slightly offset from the path of movement of the advancing can bodies, of means operable while said advancing means is at rest for shifting each can body in turn from position in its normal path of advancing movement to position for the reception of a delivered head or cover and by said shifting movement actuate said cover delivering means.

12. In a device of the character described, the combination, with means for advancing can bodies successively to the seaming mechanism of a heading machine, means for retaining in stacked arrangement a supply of heads or covers for said can bodies, said retaining means being located to position said stack above and slightly offset from the path of advancing movement of said can bodies, and means for releasing the bottom cover of the stack for delivery to a can body positioned underneath said stack, of means for shifting each can body in turn from position in its normal path of movement to position underneath said stack and by such shifting movement actuate said can releasing means.

13. In a device of the character described, the combination, with intermittently actuated means for advancing can bodies successively to the seaming mechanism of a heading machine, means for retaining in stacked arrangement a supply of heads or covers for said can bodies, said retaining means being located to position said stack above and slightly offset from the path of advancing movement of said can bodies, and means operable when said advancing means are at rest for releasing the bottom cover of the stack for delivery to a can body positioned underneath said stack, of means for shifting each can body in turn from position in its normal path of movement to position underneath said stack and by such shifting movement actuate said cover releasing means.

14. In a device of the character described, the combination, with means for advancing can bodies successively to the seaming mechanism of a heading machine, and means for delivering a head or cover to each of said can bodies in transit, said delivering means being located above and slightly offset from the path of movement of the advancing can bodies, of means for shifting each can body in turn from position in its normal path of advancing movement to position for the reception of a delivered head or cover, and means operated by a shifting can body to actuate said cover delivering means.

15. In a device of the character described, the combination, with intermittently actuated means for advancing can bodies successively to the seaming mechanism of a heading machine, and means for delivering a head or cover to each of said can bodies in turn while said advancing means are at rest, said delivering means being located above and slightly offset from the path of movement of the advancing can bodies, of means operable while said advancing means are at rest for shifting each can body in turn from position in its normal path of advancing movement to position for the reception of a delivered head or cover, and means operated by a shifting can body for actuating said cover delivering means.

16. In a device of the character described, the combination, with means for advancing can bodies successively to the seaming mechanism of a heading machine, means for retaining in stacked arrangement a supply of heads or covers for said can bodies, said retaining means being located to position said stack above and slightly offset from the path of advancing movement of said can bodies, and means for releasing the bottom cover of the stack for delivery to a can body positioned underneath said stack, of means for shifting each can body in turn from position in its normal path of movement to position underneath said stack, and means operated by a shifting can body for actuating said cover releasing means.

17. In a device of the character described, the combination, with intermittently actuated means for advancing can bodies successively to the seaming mechanism of a heading machine, means for retaining in stacked arrangement a supply of heads or covers for said can bodies, said retaining means being located to position said stack above and slightly offset from the path of advancing movement of said can bodies, and means operable when said advancing means are at rest for releasing the bottom cover of the stack for delivery to a can body positioned underneath said stack, of means for shifting each can body in turn from position in its normal path of movement to position underneath said stack, said means being actuated while said advancing means are at rest, and means operated by a shifting can body for actuating said cover releasing means.

18. In a device of the character described, the combination, with an endless conveyer having means for engaging can bodies and advancing the same successively to the seaming mechanism of a heading machine, and means for delivering a head or cover to each of said can bodies in transit, said delivering means being located above and slightly offset from the path of movement of the advancing can bodies, of means for shifting each can body in turn without withdrawal of the same from said engaging means from position in its normal path of advancing movement to position for the reception of a delivered head or cover, and means operable by a shifting can body for actuating said cover delivering means.

19. In a device of the character described, the combination, with an intermittently actuated endless conveyer having means for engaging can bodies and advancing the same successively to the seaming mechanism of a heading machine, and means for delivering a head or cover to each of said can bodies in turn while said conveyer is at rest, said delivering means being located above and slightly offset from the normal path of movement of the advancing can bodies, of means operable while said conveyer is at rest for shifting each can body in turn without withdrawal of the same from said engaging means from position in its normal path of advancing movement to position for the reception of a delivered head or cover, and means operable by a shifting can body for actuating said cover releasing means.

20. In a device of the character described, the combination, with an endless conveyer having means for engaging can bodies and advancing the same successively to the seaming mechanism of a heading machine, means for retaining in stacked arrangement a supply of heads or covers for said can bodies, said retaining means being located to position said stack above and slightly offset from the normal path of advancing movement of said can bodies, and means for releasing the bottom cover of the stack for delivery to a can body positioned underneath said stack, of means for shifting each can body in turn without withdrawal of the same from said engaging means from position in its normal path of advancing movement to position for the reception of a delivered head or cover, and means operated by a shifting can body for actuating said cover releasing means.

21. In a device of the character described, the combination, with an intermittently actuated endless conveyer having means for engaging can bodies and advancing the same successively to the seaming mechanism of a heading machine, means for retaining in stacked arrangement a supply of heads or covers for said can bodies, said retaining means being located to position said stack above and slightly offset from the normal path of movement of the advancing can bodies, and means operable while said conveyer is at rest for releasing the bottom cover of the stack for delivery to a can body positioned underneath said stack, of means operable while said conveyer is at rest for shifting each can body in turn without withdrawal of the same from said engaging means from position in its normal path of advancing movement to position for the reception of a delivered head or cover, and means operable by a shifting can body for actuating said cover releasing means.

22. In a device of the character described, the combination, with means for advancing can bodies successively to the seaming mechanism of a heading machine, and means for delivering a head or cover to each of said can bodies in transit, said delivering means being located above and slightly offset from the path of movement of the advancing can bodies, of means for shifting each can body in turn from position in its normal path of advancing movement to position for the reception of a delivered head or cover and by such shifting movement actuate said cover delivering means, and means for returning the shifted can body to said normal path of advancing movement after operation of said cover delivering means.

23. In a device of the character described, the combination, with means for advancing can bodies successively to the seaming mechanism of a heading machine, and means for delivering a head or cover to each of said can bodies in transit, said delivering means being located above and slightly offset from the normal path of advancing movement of the can bodies, of means for shifting each can body in turn from position in said normal path of advancing movement to position for the reception of a delivered head or cover and by such shifting movement actuate said cover delivering means, and means for returning said cover delivering means to positions for the next succeeding cover delivery and thereby return said can body to position in said normal path of advancing movement.

24. In a device of the character described, the combination, with means for advancing can bodies successively to the seaming mechanism of a heading machine, and means for delivering a head or cover to each of said can bodies in transit, said delivering means being located above and slightly offset from the normal path of advancing movement of said can bodies, of means for shifting each can body in turn from position in said normal path of movement to position for the reception of a delivered head or cover, and connecting means between a can body positioned to be shifted and said cover delivering means to actuate the latter upon shifting movement of the former and return the former to initial position after operation of the latter.

25. In a device of the character described, the combination, with intermittently actuated means for advancing can bodies successively to the seaming mechanism of a heading machine, and means for delivering a head or cover to each of said can bodies in turn while said advancing means is at rest, said delivering means being located above and slightly offset from the normal path of advancing movement of said can bodies, of means operable while said advancing means are at rest for shifting each can body in turn from position in said normal path of advancing movement to position for the reception of a delivered head or cover and by such shifting movement actuate said cover delivering means, and means for returning the shifted can body to its initial position after operation of said cover delivering means and prior to further movement of said advancing means.

26. In a device of the character described, the combination, with intermittently actuated means for advancing can bodies successively to the seaming mechanism of a heading machine, and means for delivering a head or cover to each of said can bodies in turn while said advancing means are at rest, said delivering means being located above and slightly offset from the normal path of advancing movement of said can bodies, of means operable while said advancing means are at rest for shifting each can body in turn from position in said normal path of advancing movement to position for the reception of a delivered head or cover, and connecting means between a can body positioned to be shifted and said cover delivering means to actuate the latter upon shifting movement of the former and return the former to initial position after operation of the latter and prior to further movement of said advancing means.

27. In a device of the character described, the combination, with means for advancing can bodies successively to the seaming mechanism of a heading machine, means for delivering a head or cover to each of said can bodies in transit, said delivering means being located above and slightly offset from the normal path of advancing movement of said can bodies, and a spring yieldingly opposing operation of said delivering means, of means for shifting each can body in turn from position in said normal path of advancing movement to position for the reception of a delivered head or cover, and means operated by a shifting can body to actuate said cover delivering means and thereby store energy in said spring to effect return of said can body to said normal path of advancing movement.

28. In a device of the character described, the combination, with intermittently actuated means for advancing can bodies successively to the seaming mechanism of a heading machine, means for delivering a head or cover to each of said can bodies in turn while said advancing means are at rest, said delivering means being located above and slightly offset from the normal path of advancing movement of said can bodies, and a spring yieldingly opposing operation of said delivering means, of means operable while said advancing means are at rest for shifting each can body in turn from position in said normal path of advancing movement to position for the reception of a delivered head or cover, means operated by a shifting can body for actuating said cover delivering means and thereby store energy in said spring to effect return of said can body to initial position prior to further movement of said advancing means.

29. In a device of the character described, the combination, with means for advancing can bodies successively to the seaming mechanism of a heading machine, means for retaining in stacked arrangement a supply of heads or covers for said can bodies, initially effective primary means for supporting said stack through the bottom cover thereof, initially ineffective secondary supporting means adapted to be interposed between the bottom cover and the remainder of the stack, and means for intermittently actuating said secondary supporting means, of means operable only through the interposition of a can body therein for withdrawing said primary supporting means coincidently with interposition of said secondary supporting means.

30. In a device of the character described, the combination, with means for advancing can bodies successively to the seaming mechanism of a heading machine, means for retaining in stacked arrangement a supply of heads or covers for said can bodies, said retaining means being located to position said stack above and slightly offset from the normal path of advancing movement of said can bodies, initially effective primary means for supporting said stack through the bottom cover thereof, initially ineffective secondary supporting means adapted to be interposed between the bottom cover and the remainder of the stack, and means for intermittently actuating said secondary supporting means, of means for shifting each can body in turn from position in said normal path of advancing movement to position underneath said stack and by such shifting movement withdraw said primary supporting means coincidently with interposition of said secondary supporting means.

31. In a device of the character described, the combination, with intermittently actuated means for advancing can bodies successively to the seaming mechanism of a heading machine, means for retaining in stacked arrangement a supply of heads or covers for said can bodies, said retaining means being located to position said stack above and slightly offset from the normal path of advancing movement of said can bodies, initially effective primary means for supporting said stack through the bottom cover thereof, initially ineffective secondary supporting means adapted to be interposed between the bottom cover and the remainder of the stack, and means for intermittently actuating said secondary supporting means, of means operable when said advancing means are at rest for shifting each can body in turn from position in said normal path of advancing movement to position underneath said stack and by said shifting movement withdraw said primary supporting means coincidently with the interposition of said secondary supporting means.

32. In a device of the character described, the combination, with an endless conveyer having means for engaging can bodies and advancing the same successively to the seaming mechanism of a heading machine, means for retaining in stacked arrangement a supply of heads or covers for said can bodies, said retaining means being located to position said stack above and slightly offset from the normal path of advancing movement of said can bodies, initially effective primary means for supporting said stack through the bottom cover thereof, initially ineffective supporting means adapted to be interposed between the bottom cover and the remainder of the stack, and means for intermittently actuating said secondary supporting means, of means for shifting each can body in turn without withdrawal of the same from said engaging means from position in said normal path of advancing movement to position underneath said stack for the reception of a delivered cover, and means operated by a shifting can body for withdrawing said primary supporting means coincidently with interposition of said secondary supporting means.

33. In a device of the character described, the combination, with an intermittently actuated endless conveyer having means for engaging can bodies and advancing the same successively to the seaming mechanism of a heading machine, means for retaining in stacked arrangement a supply of heads or covers for said can bodies, said retaining means being located to position said stack above and slightly offset from the normal path of advancing movement of said can bodies, initially effective primary means for supporting said stack through the bottom cover thereof, initially ineffective secondary supporting means adapted to be interposed between the bottom cover and the remainder of the stack, and means for intermittently actuating said secondary supporting means, of means operable while said conveyer is at rest for shifting each can body in turn without withdrawal of the same from said engaging means from position in said normal path of advancing movement to position underneath said stack for the reception of a delivered cover, and means operated by a shifting can body for withdrawing said primary supporting means coincidently with interposition of said secondary supporting means.

34. In a device of the character described, the combination, with means for advancing can bodies successively to the seaming mechanism of a heading machine, means for retaining in stacked arrangement a supply of heads or covers for said can bodies, said retaining means being located to position said stack above and slightly offset from the normal path of advancing movement of said can bodies, initially effective primary means for supporting said stack through the bottom cover thereof, initially ineffective secondary supporting means adapted to be interposed between the bottom cover and the remainder of the stack, and means for intermittently actuating said secondary supporting means, of means for shifting each can body in turn from position in said normal path of advancing movement to position underneath said stack and by such shifting movement withdraw said primary supporting means coincidently with interposition of said secondary supporting means, and means for returning the shifted can body to said normal path of advancing movement after withdrawal of said primary supporting means and thereby return the latter to effective position.

35. In a device of the character described, the combination, with means for advancing can bodies successively to the seaming mechanism of a heading machine, means for retaining in stacked arrangement a supply of heads or covers for said can bodies, said retaining means being located to position said stack above and slightly offset from the normal path of advancing movement of said can bodies, initially effective primary means for supporting said stack through the bottom cover thereof, initially ineffective secondary supporting means adapted to be interposed between the bottom cover and the remainder of the stack, and means for intermittently actuating said secondary supporting means, of means for shifting each can body in turn from position in said normal path of advancing movement to position underneath said stack, and connecting means between the can body to be shifted and said primary supporting means to withdraw the latter upon shifting movement of the former and return the former to said normal path of advancing movement after withdrawal of the latter.

36. In a device of the character described, the combination, with intermittently actuated means for advancing can bodies successively to the seaming mechanism of a heading machine, means for retaining in stacked arrangement a supply of heads or covers for said can bodies, said retaining means being located to position said stack above and slightly offset from the normal path of advancing movement of said can bodies, initially effective primary means for supporting said stack through the bottom cover thereof, initially ineffective secondary supporting means adapted to be interposed between the bottom cover and the remainder of the stack, and means for intermittently actuating said secondary supporting means, of means operable while said advancing means are at rest for shifting each can body in turn from position in said normal path of advancing movement to position underneath said stack and by such shifting movement withdraw said primary supporting means coincidently with interposition of said secondary supporting means, and means for returning the shifted can body to said normal path of advancing movement prior to further movement of said advancing means and after withdrawal of said primary supporting means and thereby return the latter to effective position.

37. In a device of the character described, the combination, with intermittently actuated means for advancing can bodies successively to the seaming mechanism of a heading machine, means for retaining in stacked arrangement a supply of heads or covers for said can bodies, said retaining means being located to position said stack above and slightly offset from the normal path of advancing movement of said can bodies, initially effective primary means for supporting said stack through the bottom cover thereof, initially ineffective secondary supporting means adapted to be interposed between the bottom cover and the remainder of the stack, and means for actuating said secondary supporting means, of means operable while said advancing means are at rest for shifting each can body in turn from position in said normal path of advancing movement to position underneath said stack, and connecting means between the can body to be shifted and said primary supporting means operable when said advancing means are at rest to withdraw said primary supporting means upon shifting movement of said can body and return the latter to initial position in said normal path of advancing movement after withdrawal of said primary supporting means and prior to further movement of said advancing means.

38. In a device of the character described, the combination, with means for advancing can bodies successively to the seaming mechanism of a heading machine, means for retaining in stacked arrangement a supply of heads or covers for said can bodies, said retaining means being located to position said stack above and slightly offset from the normal path of movement of said advancing can bodies, initially effective primary means for supporting said stack through the bottom cover thereof, initially ineffective secondary supporting means adapted to be interposed between the bottom cover and the remainder of the stack, means for intermittently actuating said secondary supporting means, and a spring for yieldingly opposing withdrawal of said primary supporting means, of means for shifting each can body in turn from position in said normal path of advancing movement to position underneath said stack for the reception of a delivered cover and by such shifting movement withdraw said primary supporting means coincidently with interposition of said secondary supporting means and thereby store energy in said spring to effect the return of said can body to said normal path of advancing movement.

39. In a device of the character described, the combination, with intermittently actuated means for advancing can bodies successively to the seaming mechanism of a heading machine, means for retaining in stacked arrangement a supply of heads or covers for said can bodies, said retaining means being located to position said stack above and slightly offset from the normal path of advancing movement of said can bodies, initially effective primary means for supporting said stack through the bottom cover thereof, initially ineffective secondary supporting means adapted to be interposed between the bottom cover and the remainder of the stack, means for intermittently actuating said secondary supporting means, and a spring for yieldingly opposing withdrawal of said primary supporting means, of means operable when said advancing means are at rest for shifting each can body in turn from position in said normal path of advancing movement to position underneath said stack and by said shifting movement withdraw said primary supporting means coincidently with interposition of said secondary supporting means and thereby store energy in said spring to effect the return of said can body to said normal path of advancing movement prior to further movement of said advancing means.

40. In a device of the character described, the combination, with an endless conveyer having means for engaging can bodies and advancing the same successively to the seaming mechanism of a heading machine. means for retaining in stacked arrangement a supply of heads or covers for said can bodies, said retaining means being located to position said stack above and slightly offset from the normal path of movement of said advancing can bodies, initially effective primary means for supporting said stack through the bottom cover thereof, initially ineffective secondary supporting means adapted to be interposed between the bottom cover and the remainder of the stack, means for intermittently actuating said secondary supporting means, and a spring for yieldingly opposing withdrawal of said primary supporting means, of means for shifting each can body in turn without withdrawal of the same from said engaging means from position in said normal path of advancing movement to position underneath said stack for the reception of a delivered cover, and means operated by a shifting can body for withdrawing said primary supporting means coincidently with the interposition of said secondary supporting means and thereby store energy in said spring to effect the return of said can body to said normal path of advancing movement.

41. In a device of the character described, the combination, with an intermittently actuated endless conveyer having means for engaging can bodies and advancing the same to the seaming mechanism of a heading machine, means for retaining in stacked arrangement a supply of heads or covers for said can bodies, said retaining means being located to position said stack above and slightly offset from the normal path of movement of said advancing can bodies, initially effective primary means for supporting said stack through the bottom cover thereof, initially ineffective secondary supporting means adapted to be interposed between the bottom cover and the remainder of the stack, means for intermittently actuating said secondary supporting means, and a spring for yieldingly opposing withdrawal of said primary supporting means, of means operable while said conveyer is at rest for shifting each can body in turn without withdrawal of the same from said engaging means from position in said normal path of advancing movement to position underneath said stack for the reception of a delivered cover, and means operated by a shifting can body for withdrawing said primary supporting means coincidently with the interposition of said secondary supporting means and thereby store energy in said spring to effect the return of said can body to said normal path of advancing movement prior to further movement of said conveyer.

In testimony of the foregoing, I have hereunto set my hand in the presence of two witnesses.

JULIUS BRENZINGER.

Witnesses:
L. REISMAN,
LORRELLIO F. LITTLE.

Copies of this patent may be obtained for five cents each, by addressing the "Commissioner of Patents, Washington, D. C."